Sept. 12, 1939.　　　　J. GRIGNOLO　　　　2,172,507
PICK-UP DEVICE
Filed Dec. 13, 1938　　　　2 Sheets-Sheet 1
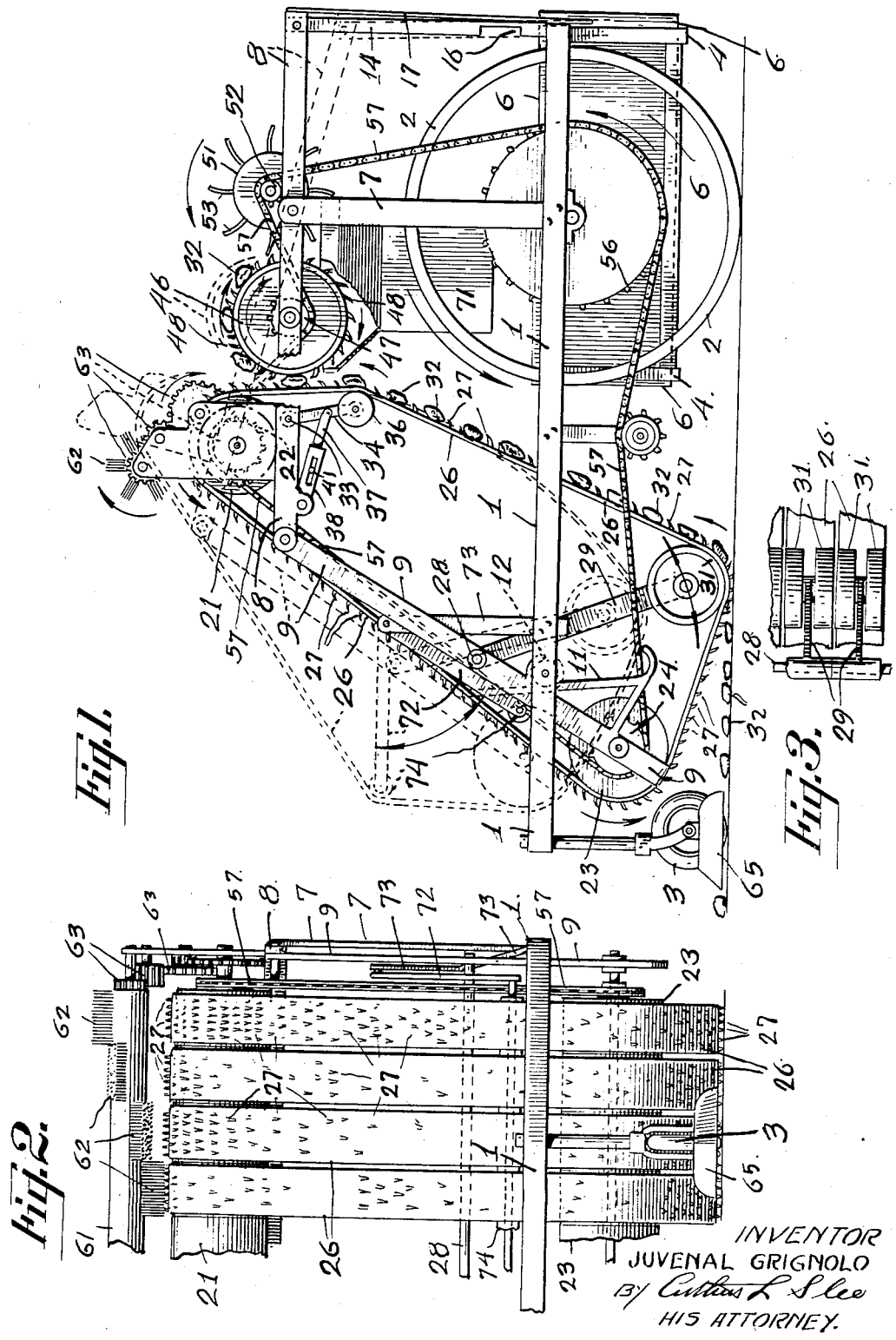
INVENTOR
JUVENAL GRIGNOLO
BY Cuthers L. Slee
HIS ATTORNEY.

Sept. 12, 1939.  J. GRIGNOLO  2,172,507
PICK-UP DEVICE
Filed Dec. 13, 1938  2 Sheets-Sheet 2
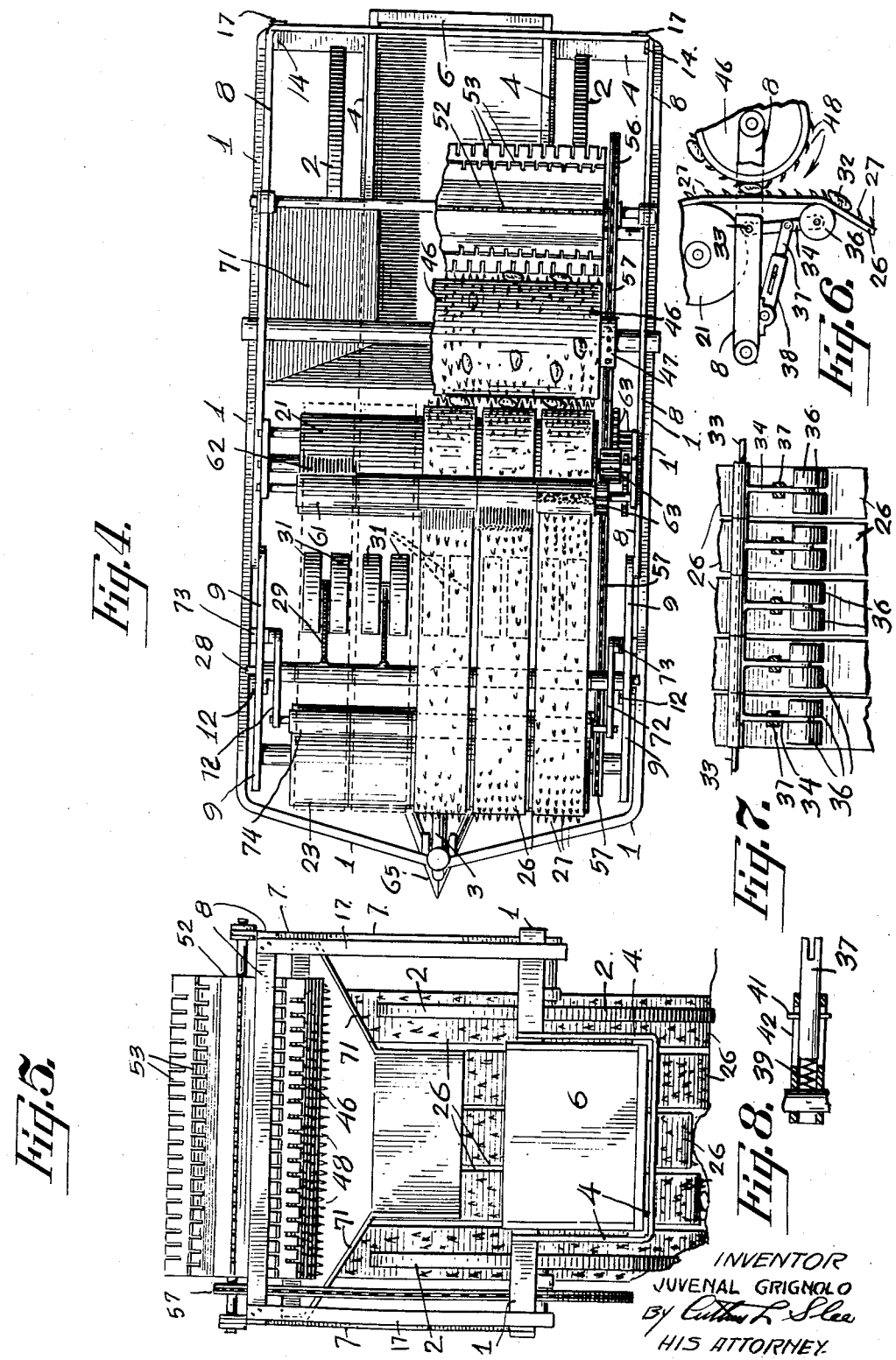
INVENTOR
JUVENAL GRIGNOLO
By Arthur L. Lee
HIS ATTORNEY Patented Sept. 12, 1939

2,172,507

UNITED STATES PATENT OFFICE 2,172,507

PICK-UP DEVICE

Juvenal Grignolo, San Francisco, Calif.

Application December 13, 1938, Serial No. 245,396

2 Claims. (Cl. 56—328)

My invention relates to improvements in a pick-up device for use with a fruit-gatherer, having a carriage and a receptacle, wherein a plurality of substantially vertically disposed parallel belts mounted for movement upon said carriage are provided with forwardly inclined pins or picking elements and operate in conjunction with means for automatically and yieldingly holding a portion of each separate belt independently in contact with a portion of an uneven surface over which said carriage is moved, to impale fruit on said picking elements and convey said fruit above the receptacle and into engaging relation with a transferrer and a stripper, to deposit fruit into said receptacle.

The primary object of the present invention is to provide a new and improved pick-up device for use with a fruit gatherer having a carriage and a receptacle.

Another object is to provide a new and improved pick-up device of the character described, having improved means for yieldingly contacting separate portions of an uneven surface to pick fruit therefrom.

A further object is to provide a new and improved pick-up device of the type set forth and provided with improved means for transferring fruit, elevated by picking elements, into a suitable receptacle on a fruit gatherer.

A still further object is to provide, in conjunction with a pick-up device, improved means for effectively brushing and cleaning picking elements after impaled fruit has been removed therefrom, to remove small twigs, leaves, dirt and other foreign matter, to facilitate re-engagement of said picking elements with other fruit to be gathered.

I accomplish these and other objects by means of the improved mechanism disclosed in the drawings forming a part of the present applicatiton, and in which—

Fig. 1 is a partly broken side elevation of my improved device;

Fig. 2 is a broken front elevation of one half of the machine, the other half being similar;

Fig. 3 is a broken detail view;

Fig. 4 is a partly broken away plan view;

Fig. 5 is a partly broken rear elevation;

Fig. 6 is a broken detail of a portion of the transferring mechanism;

Fig. 7 is a broken side view of Fig. 6; and

Fig. 8 is a detail view.

Referring to the drawings:

The numeral 1 is used to designate the main frame of a suitable carriage having a pair of independent or separate wheels 2 and a swiveling caster 3 to facilitate steering. A cradle 4 supports a detachable or removable receptacle 6, which may be a lug-box or similar receptacle used for fruit.

A pair of vertical supports 7, one on each side of the main frame 1, has pivotally mounted upon the top thereof a U-shaped member 8 with the bottom of the U serving as a rear handle for propelling the carriage, with the free ends extending forwardly and pivotally connected to a pair of inclined arms 9 extending downwardly and forwardly on the inside of the main frame 1.

Each arm 9 is provided with a double-hooked bracket 11, near their lower ends, for engaging a limiting stop 12 on the main frame 1 to limit vertical movement of the arms 9 and the forward ends of the U-shaped member 8.

Hingedly suspended latches 14 on the rear end of the member 8 are provided with notches 16 for engaging the rear end of the main frame 1 to hold the forward ends of the member 8 and the arms 9 elevated to an inoperative position, as disclosed in dotted lines in Fig. 1 of the drawings. The notches 16 are normally held in engaging relation with said main frame 1 by the tension of flat springs 17 secured to and depending from the rear of the member 8 and exerting a tension against said latches 14.

A suitable roller 21, provided with a sprocket 22, is rotatably mounted between the free or forward ends of the member 8 while a similar roller 23 having a sprocket 24 is rotatably mounted between the lower ends of said arms 9.

A plurality of substantially vertically disposed flexible endless and slack belts 26 are loosely draped in parallel relation over the rollers 21 and 23 and are provided on their outer surfaces with a plurality of forwardly inclined or slanted pins or picking elements 27. That is to say, that the pins or picking elements 27 are inclined in the direction in which the belts 26 are moved, the purpose of which will hereinafter be more fully set forth.

A rod 28 is mounted between the arms 9 and above the roller 23 and from this rod are freely suspended links 29, one for each belt 26, each of said links 29 being provided at its lower end with a pair of rollers 31 which are actuated by the attraction of gravity to take up the slack in their respective belts and also to independently and separately hold the lower end of each belt 26, or rather the picking elements 27 thereon in contact with an adjacent portion of an uneven surface over which the carriage is moved.

The weight of each pair of rollers 31 on its respective belt will also yieldingly hold the picking elements 27 and their respective belts and thereby automatically and independently adjust each belt not only to an uneven surface but will also independently adjust each belt 26 and its picking elements 27 to various sizes of fruit encountered.

A rod 33 is arranged transversely between the free ends of the member 8 and also has freely and pivotally suspended therefrom links 34, one for each belt 26, and on the lower end of each link is a pair of rollers 36. To each link 34 I have pivotally attached a rod 37 slidably mounted within a sleeve 38 containing a suitable spring 39 to urge the rod 37 outwardly and the link 34 and rollers 36 against their respective belts 26, to automatically but yieldingly adjust the spaced relation of the opposite side of said belt and the elements 27 thereon and a transferrer roller 46, also rotatably mounted upon the member 8 and provided with a sprocket 47 and a plurality of forwardly inclined or slanted picking elements 48, similar to the picking elements 27 on the belts 26. The transferrer 46 is of sufficient length to span all of the parallel belts 26, at their upper portions, as disclosed in Fig. 4 of the drawings.

A stripper 51, provided with a sprocket 52 and a plurality of preferably slit-edged leather flaps 53, is also rotatably mounted upon the member 8 and parallel to and adjacent the transferrer 46.

One of the wheels 2 of the carriage 1 is provided with a sprocket 56 which drives a suitable sprocket chain 57, which chain 57 in turn drives the sprockets 52, 47, 22 and 24 of the stripper 51, transferrer 46, and rollers 21 and 24 respectively. The various ratios of said sprockets are such that the lower ends or portions of the belts 26 under the rollers 31 will travel rearwardly at the same speed with which the carriage moves forwardly so that there will be merely a contact of said lower portions with a surface and no appreciable relative movement between said belts and the ground, as the carriage progresses. Also a ratio between the sprockets 56, 52 and 47 which will cause the stripper 51 to rotate with a greater peripheral velocity than the peripheral velocity of the transferrer 46. The sprocket 47 is of smaller diameter than the diameter of the sprocket 22 so that the transferrer 46 will rotate with a greater peripheral velocity than the peripheral velocity of the roller 21 and the belts 26 driven thereby.

A brushing means, comprising a roller 61, provided with a plurality of brushes 62 arranged in relatively staggered or spiral relation, is connected by means of a step-up gear train 63 to a roller 21 so that said roller 61 will have a greater peripheral velocity than the peripheral velocity of the roller 21 and belts 26 and picking elements 27 thereon, directly above which roller 21 said roller 61 and brushes 62 are rotatably mounted, and rotating in the direction indicated by the curved arrows, in Fig. 1 of the drawings, so that the picking elements 27 will be effectively brushed and cleaned with a rapid motion on the part of said brushes 62 to remove from said picking elements any remaining debris or foreign matter, such as leaves, twigs, dirt or the ike.

In operation:

Using the rear end of the member 8 as a handle, the carriage 1 is propelled over the ground-surface of an orchard from which prunes or other fruit 32, such as olives and the like, are to be picked.

Any fruit directly within the path of the caster 3 is plowed aside, to prevent crushing, by the plow 65 attached to the caster 3. As the lower ends of the belts 26 and the picking elements 27 thereon, passing under the rollers 31, contacts said fruit 32, said picking elements 27 will, by the pressure of said rollers 31, be caused to impale said fruit, the said rollers 31, being freely and pivotally suspended, readily rising or yielding to automatically accommodate the space between said picking elements and various sizes of fruits encountered and yet exert sufficient pressure, by reason of the weight of said rollers 31, to impale said fruit upon the impaling or picking elements 27.

As the carriage 1 proceeds the sprocket 56 on one wheel 2, through the action of the sprocket chain 57 and the several sprockets involved, rotates the rollers 21 and 23 and the belts 26 thereon, at a speed or velocity backward equivalent to the forward velocity of the carriage forward so that there will be no movement of the belts 26 relative to the surface being traversed, at their lower ends or points of contact.

But, such speed will still move said belts 26 and elements 27 thereon to cause said belts and picking elements to raise the impaled fruit toward the top of the fruit gatherer and over the receptacle 6 thereon and into engaging relation with the pins or picking elements 48 upon the transferrer 46. As the sprocket 47 of said transferrer 46 is of a ratio that will rotate said transferrer at a greater peripheral velocity than the peripheral velocity of the belts 26, the forwardly inclined picking elements 48 will impale fruit 32 on the picking elements 27 of the belts 26 and remove them therefrom, as disclosed in Figs. 1 and 6 of the drawings.

Fig. 7 of the drawings discloses that there are a pair of separate and independent rollers 36 for each separate belt 26 so that each of said belts will be independently and automatically urged by its respective spring 39, see Fig. 8 of the drawings, to automatically adjust each belt to accommodate the space between it and the transferrer 46 to the dimension of the fruit passing, regardless of the different thickness or dimension of different fruit on different belts.

As the transferrer 46 is rotated the fruit 32 on the elements 48 thereof will be stripped therefrom by the slit-edged flaps 53 of the stripper 51. As this stripper 51 is driven by a sprocket 52 smaller in diameter than the diameter of the sprocket 47 of the transferrer 46, and both sprockets are driven by the same chain 57, it is obvious that the peripheral velocity of the stripper 51 and flaps 53 thereon will be greater than the peripheral velocity of the transferrer 46 and elements 48 thereon carrying the impaled fruit, and therefore said fruit will move off of said elements 48 when encountered by the faster moving flaps 53 and drop into the hopper 71 below said transferrer and the removable receptacle 6 under said hopper.

As the movements of the belts 26 continue and carry said picking elements 27 over the upper ends of said belts 26, or over the roller 21, the staggered or spirally arranged brushes 62 upon the roller 61, rotated at a greater speed through the step-up gear-train 63 than the speed of the roller 21, will readily pass over and effectively brush the elements 27 in the direction of their inclination and thereby remove any twigs, leaves or other foreign matter which might interfere with an effective impaling action on the part of said elements when they again encounter fruit to be picked.

It should be particularly noted that the rollers 31 not only automatically and yieldingly adjust the lower or contacting elements 27 on the belts 26 to the variations in fruit sizes, but by reason of their freely suspended nature, these rollers 31, actuated by the attraction of gravity, readily adjust these belts to cavities or projections of an uneven surface and separately and independently of each other. In this manner fruit lying upon an uneven surface may be effectively gathered.

When not in operation and during transportation to and from a location, contact of the lower ends of the belts and picking elements thereon with the ground may be prevented by pressing downwardly on the rear or handle end of the member 8 so that the forward ends thereof and the arms 9 and rollers 21 and 23 will be elevated, as disclosed in dotted lines in Fig. 1 of the drawings. When moved to this position the notches 16 will be held in engaging relation with the rear end of the main frame 1 by the pressure or tension of the springs 17 against the latches 14. Upward movement of the forward end of the member 8 and arms 9 connected thereto as well as a lower operative position of said member 8, arms 9 and belts 26, is limited by the oppositely positioned hooks on the ends of the brackets 11 which engage the stops 12 on the inner sides of the main frame, as disclosed in Figs. 1 and 4 of the drawings.

When being moved into inoperative position the rod 28 will engage arms 72 pivotally connected at one end to vertical uprights 73 on the main frame 1, one on each side, and having a support 74 on their other ends, and raise said support 74 to engage the inner sides of all of the belts 26 to take up a major portion of the slack caused in said belts when the freely suspended arms 29 and rollers drop to a lower position. This arrangement prevents the arms 29 and rollers from dropping to a true vertical position which would produce excessive slack in said belts.

Having described my invention, I claim—

1. A pick-up device for a fruit-gatherer, having a carriage and receptacle, comprising a substantially vertically disposed flexible belt mounted for movement on said carriage and provided with forwardly inclined picking elements on the outer side thereof; means for yieldingly holding the lower end of said belts and picking elements thereon in contact with a surface, over which said carriage may be moved, to impale fruit on said surface and elevate said fruit, a rotary transferrer upon said carriage arranged in spaced relation to an upper portion of said belt and above said receptacle, said transferrer being provided with forwardly inclined picking elements on the periphery thereof; means connected with said carriage for moving said belt at a peripheral velocity equal to the velocity of said carriage, when moved over said surface, for rotating said transferrer at a greater peripheral velocity than the peripheral velocity of said belt, to permit the picking elements on said transferrer to engage and move off of said picking elements of said belt any fruit impaled therein; stripping means for stripping fruit from said transferrer and into said receptacle; and means for yieldingly holding the upper portion of said belt in spaced relation to said transferrer to automatically adjust the space between said belt and transferrer to various sizes of fruit on said belt.

2. A pick-up device for a fruit-gatherer, having a carriage and receptacle, comprising a plurality of substantially vertically disposed flexible belts mounted in parallel relation for movement on said carriage, each belt being provided with forwardly inclined picking elements on the outer face thereof; means for independently and yieldingly holding the lower end of each belt and the picking elements thereon in contact with an uneven surface over which said carriage may be moved to impale fruit lying on said uneven surface onto said picking elements and elevate said fruit with said belts; a rotary transferrer mounted on said carriage and above said receptacle and in spaced relation to the upper ends of said belts, said transferrer being provided with forwardly inclined picking elements on the periphery thereof; stripping means for stripping fruit from said transferrer into said receptacle; means for independently and yieldingly holding the upper portion of each belt in spaced relation to said transferrer to automatically adjust the space between each belt and said transferrer to various sizes of fruit passing through said space; and means for moving said belts at a peripheral velocity equal to the velocity of said carriage over said uneven surface and for rotating said transferrer at a greater peripheral velocity than the peripheral velocity of said belts and the stripping means at a greater peripheral velocity than the peripheral velocity of said transferrer.

JUVENAL GRIGNOLO.